United States Patent [19]

Woodrum

[11] 3,835,467

[45] Sept. 10, 1974

[54] MINIMAL REDUNDANCY DECODING METHOD AND MEANS

[75] Inventor: Luther Jay Woodrum, Poughkeepsie, N.Y.

[73] Assignee: International Business Machines Corporation, Armonk, N.Y.

[22] Filed: Nov. 10, 1972

[21] Appl. No.: 305,631

[52] U.S. Cl. .......................................... 340/347 DD

[51] Int. Cl. .............................................. H04l 3/00

[58] Field of Search .................. 340/347 DD, 172.5; 235/154; 178/DIG. 3, 26 A, 23 R

[56] References Cited

UNITED STATES PATENTS

| | | | |
|---|---|---|---|
| 3,474,442 | 10/1969 | Centanni | 235/154 |
| 3,675,211 | 7/1972 | Raviv | 340/172.5 |
| 3,689,899 | 9/1972 | Franaszek | 340/172.5 |
| 3,694,813 | 9/1972 | Loh et al. | 340/172.5 |
| 3,701,108 | 10/1972 | Loh et al. | 340/172.5 |
| 3,716,851 | 2/1973 | Neumann | 340/347 DD |
| 3,717,851 | 2/1973 | Cocke et al. | 340/347 DD X |
| 3,726,993 | 4/1973 | Lavallee | 178/DIG. 3 |

OTHER PUBLICATIONS

Mahoney et al., "Digital Communications," from RCA Institutes Lecture Notes, 1966 pg. 3.7–3.9.

Coleman et al., "IBM Technical Disclosure Bulletin," Vol. 14, No. 11, April 1972, pg. 3314–3315.

*Primary Examiner*—Charles D. Miller

*Attorney, Agent, or Firm*—Bernard M. Goldman

[57] ABSTRACT

Electronically decoding variable length minimal redundancy binary input codes into characters in a character set. Code flexibility is provided by easily supporting (1) different transmitted codes for the same outputted character set, and (2) the same transmitted code for different output character sets. Tree structured codes are used for translating minimal redundancy codes into characters, which are well-known in the prior art of Huffman codes, in which the sink vertices in a binary tree correspond to characters in a character set. The set of path vectors in the binary tree is the minimal redundancy encoding for the characters represented by the sinks. A bit sequence store T has its bit positions set to represent the binary tree, in which the bit positions are set to correspond to the vertices in the tree when it is scanned in left list order; and a 1 setting represents an inner vertex and a 0 setting represents a sink vertex in the binary tree. Store T is easily reset to permit easy changes in the binary tree represented therein, in order to support (1) and (2) above. The path vectors in the tree are transmitted as the coded characters are decoded using the correct tree set into store T.

2 Claims, 14 Drawing Figures

FIG. 1A
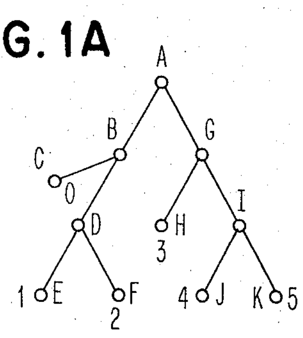
FIG. 1B
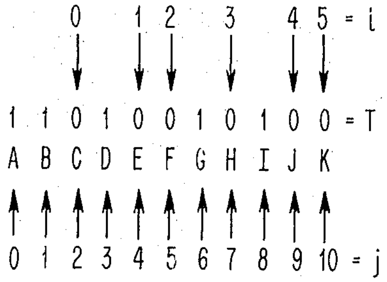
FIG. 1C
| CHAR | i | BYTE |
|---|---|---|
| C | 0 | 0 1 1 0 0 1 1 0 |
| E | 1 | 1 1 0 0 1 0 1 0 |
| F | 2 | 1 0 1 1 0 1 1 0 |
| H | 3 | 0 1 1 1 0 1 1 1 |
| J | 4 | 1 0 0 0 1 0 0 0 |
| K | 5 | 1 1 0 0 0 1 1 1 |
FIG. 1D
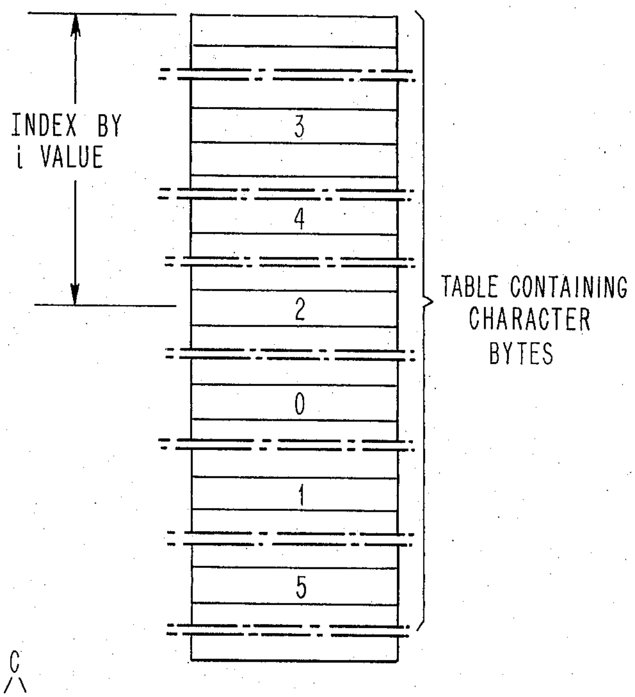
FIG. 1E
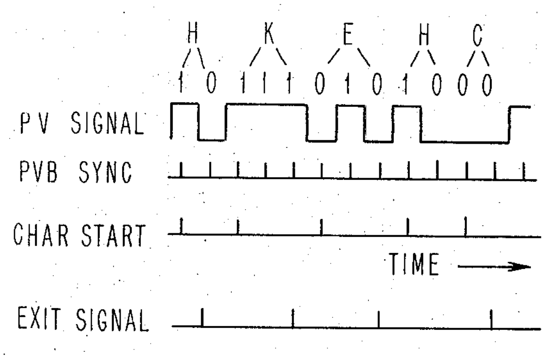

FIG. 6A
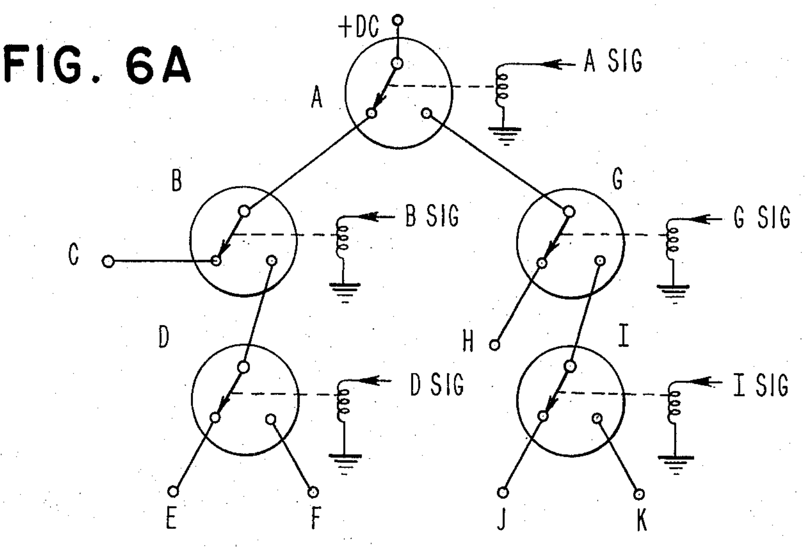
FIG. 6B
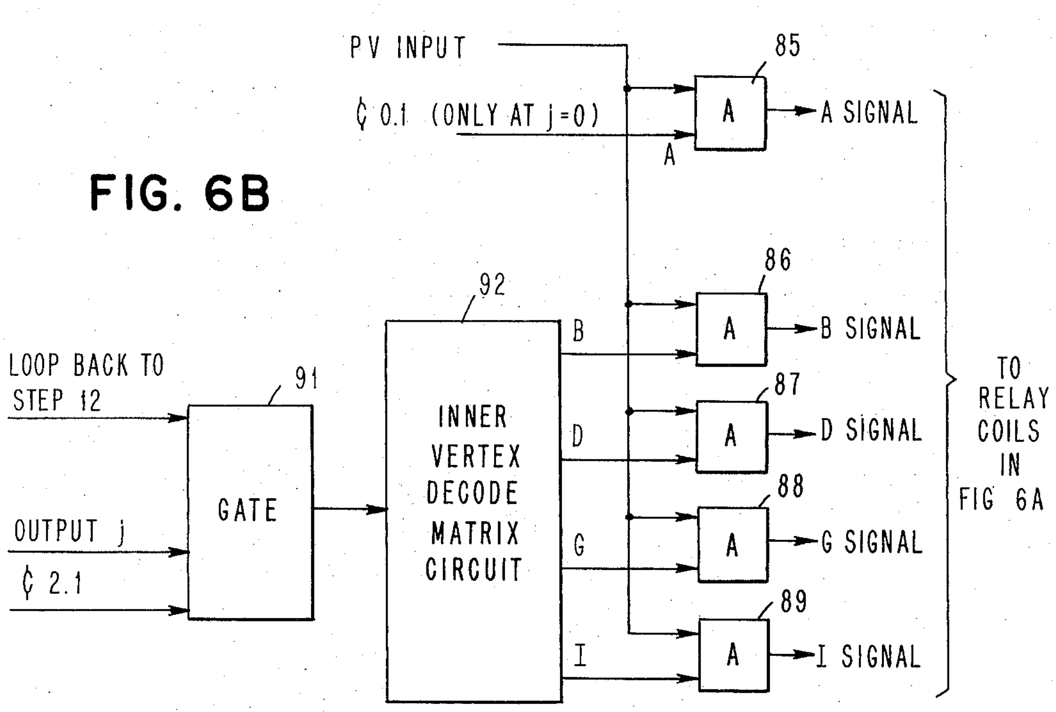
| SELECTED j COUNT | INNER VERTEX DECODE |
|---|---|
| 0 | A SIGNAL |
| 1 | B SIGNAL |
| 3 | D SIGNAL |
| 6 | G SIGNAL |
| 8 | I SIGNAL |
FIG. 6C

MINIMAL REDUNDANCY DECODING METHOD AND MEANS

The method decodes a received path vector by a sequential sensing of the bits in store T until a sink is found, which has its sink index in T decoded as the transmitted character. The sink index in store T can directly represent the character for character sets coded in a binary collating sequence, such as EBC πC or USASCII. For other character sets (such as BCD), the sink index value requires another translation step for determining the required character. A novel method embodiment and a novel hardware embodiment for doing this are disclosed.

TABLE OF CONTENTS

| | Col. No. |
|---|---|
| Abstract | 1 |
| Introduction | 1 |
| Prior Art | 2 |
| Objects and Features | 3 |
| Description of the Drawings | 3 |
| Symbol Table | 3 |
| Binary Tree Decoding Relationships | 5 |
| Decoding Method Embodiment | 8 |
| Example 1 | |
| Step by step decode of PV=(1,0) | 8 |
| Example 2 | |
| Iteration decode of PV=(1,0) | 8 |
| Example 3 | |
| Iteration decode of PV=(1,1,1) | 8 |
| Hardware Embodiment | 9 |
| A. Data Receiving Set | 9 |
| B. Hardware Embodiment Clocking | 11 |
| C. Hardware Logic Circuits | 12 |
| Output Control Hardware | 13 |
| A. Variable Sink Controlled Output | 13 |
| B. Inner Vertex Controlled Output | 14 |
| Claims | |

INTRODUCTION

This invention relates generally to a method and means for decoding a set of variable-length data characters having minimal redundancy Huffman encoding of data. The variable length codes may be generated by the method and means in U.S. Pat. application Ser. No. 213,604 filed Dec. 29, 1971 by the same inventor entitled "Minimal Redundancy Encoding Method and Means."

The entire specification of prior filed U.S. Pat. application No. 213,604 is incorporated by this reference into this specification. In order to enable the reader to better understand the invention described and claimed in this specification, an understanding of the representation of the minimal redundancy encoding is essential. This may be gained by understanding the subject matter in application Ser. No. 213,604, and of Huffman codes in general.

PRIOR ART

The prior art includes such works as "Fundamental Algorithms, The Art of Computer Programming" by D. E. Knuth published in 1968 by Addison-Wesley Publishing Company, "Automatic Data Processing" by F. P. Brooks and K. E. Iverson, published by Wiley, and "A Programming Language" by K. E. Iverson published by Wiley, all of which are widely being taught in many universities to students working toward B. S. degrees in Computing Science; therefore they must be considered current average skill-in-the-art tools in the digital computer arts.

The terminology used in this specification is similar to the terminology used in these works and in the journal of the ACM.

The art also includes the following prior USA patents and applications: U.S. Pat. No. 3,694,813 "Method of Achieving Data Compaction Utilizing Variable-Length Dependent Coding Techniques" issued Sept. 26, 1972; U.S. Pat. No. 3,701,108 "Code Processor for Variable-Length Dependent Codes" issued Oct. 24, 1972; and Ser. No. 119,275 "Method of Decoding a Variable Length Prefix Free Compaction Code" filed Feb. 26, 1971, each having been invented by L. S. Loh, J. H. Mommens and J. Raviv and assigned to the same assignee as the subject invention. Ser. No. 136,951 "Directory Insertion and Deletion Method and Means" filed Apr. 23, 1971 by L. J. Woodrum defines terminology similar to that used in this application with regard to binary trees.

OBJECTS AND FEATURES

Objects and features of this invention are:

1. To provide a method for decoding Huffman code representations for transmitted characters. Each character representation comprises a sequence of bits in which each bit position represents a bit in a path vector in a binary tree, in which the sink vertices correspond to the characters in the utilized character set.

2. To provide a method for decoding Huffman codes which represents a binary tree in the decoding process as a recorded bit sequence in left list order, in which each inner vertex of the tree is identified as a 1 bit and each sink is identified as a 0 bit.

3. To provide a hardware system which can provide the objects and features in (1) and (2).

4. To provide a method and hardware for decoding input characters represented by different sets of variable length codes which can be minimally redundant. The binary tree path vector encoding for a character set can be constructed differently for different data bases to provide a bit length inversely proportional to the frequency of transmission of the respective characters in the character set for the different data bases.

5. To provide a method and system for decoding received bit sequences representing path vectors in a binary tree into received characters.

6. To provide a method and means for decoding a transmitted path vector by serially scanning a bit representation T of a particular binary tree, in which the transmitted character is found by locating its corresponding sink in the tree at a specified number of sink bits from the beginning of the bit representation T.

7. To provide a method and means enabling the correlation of signals received in path vector form with a predetermined character set, and for easily changing the transmitted path vector codes for the same character set by correspondingly changing a decoding binary tree setting in a bit sequence store T.

8. To provide a method and means in which a decoding translation tree store T is easily changed by only changing its bit settings representing a binary tree, for supporting different character sets with the same transmitted codes, or different transmitted codes for the same character set.

DESCRIPTION OF THE DRAWINGS

The foregoing and other objects, features and advantages of the invention will be apparent from the following more particular description of the preferred embodiments of the invention, as illustrated in the accompanying drawings.

FIG. 1A illustrates an example of a binary tree, which is used for the purpose of showing the relationship between path vectors and characters represented by sink vertices of the tree.

FIG. 1B illustrates a bit sequence T which represents a left list scan of the vertices in the binary tree in FIG. 1A with a 1 bit indicating an inner vertex and a 0 bit indicating a sink vertex. Vertex labeling, the vertex scan indices *j*, and sink indices *i* are also shown.

FIG. 1C shows a table providing relationships among the labeled sink characters, their sink indices *i*, and fixed length byte codes representing the characters.

FIG. 1D is a table for translating indices *i* into character bytes, similar to the table in FIG. 1C, as it might be implemented on a programmed general purpose computer.

FIG. 1E illustrates signals provided to and by a MODEM which provides inputs to the described hardware embodiment.

FIGS. 6A and B illustrate circuitry for establishing an electrical circuit by means of a decoded path vector; and FIG. 6C illustrates a table showing the relationships for the inner vertex decoding.

SYMBOL TABLE

Figure 2:
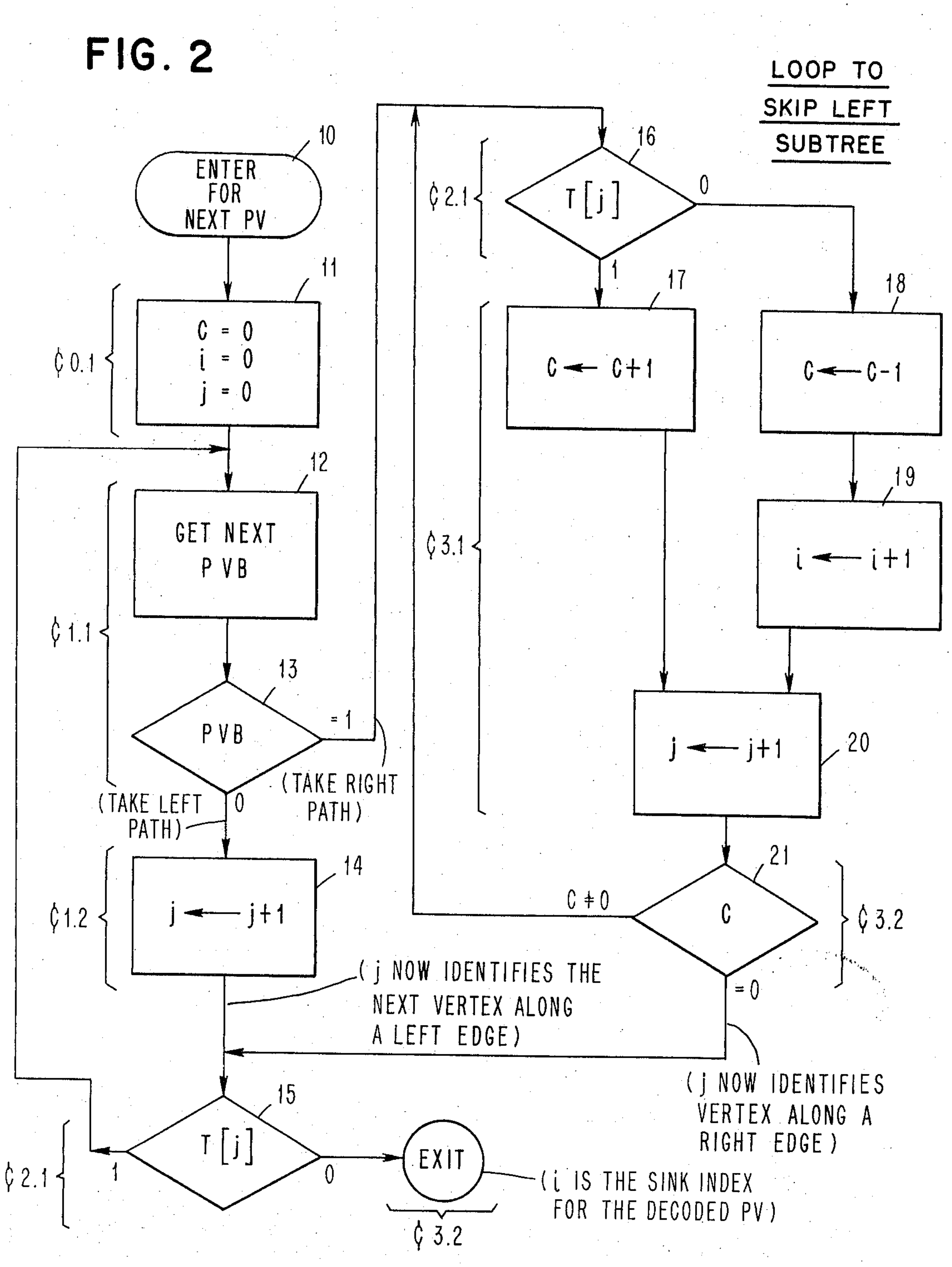
FIG. 2 is a flow diagram of the inventive method in this specification.

PV : Path vector.

PVB : Path vector bit.

*i* : The sink sequence number in T in the set 0,1 . . . ,I. Thus I is the highest sink sequence number in the set.

T : A bit sequence representing a binary tree in left list order, in which a 1 represents an inner vertex and a 0 is a sink vertex.

*j* : Index of the current bit in T. It is a value in the set 0,1, . . . ,J. Thus J is the index of the highest bit position in T.

C : Skip count. It represents the arithmetic difference between the number of inner vertices and the number of sinks encountered during a scan to skip all the bits for a left subtree in T to establish the next T[*j*] along a right edge in the path.

T[*j*] : The bit in T at index *j*.

The DEFINITION TABLE in U.S. Pat. application Ser. No. 136,951 is included herein by reference.

BINARY TREE DECODING RELATIONSHIPS

The invention uses a binary tree representation of a code translation, which is well-known in the art with respect to Huffman codes. An example of a code translation tree is shown in FIG. 1A in which the binary tree comprises a plurality of vertices A through K. Vertex A is the source of the tree, and its sinks are vertices C, E, F, H, J and K. The inner vertices of the tree are the non-sink vertices, including the source; in FIG. 1A the inner vertices are A, B, D, G and I.

The path vector to any sink vertex represents a trace through the tree from its source vertex to that sink. Each bit in the path vector corresponds to a respective edge in the path. Each bit in the path vector indicates by its 0 or 1 value whether to select the left or right edge from a respective inner vertex in tracing the path. Thus the bits in the path vector from left to right represent the edge selections in the path from the source to the selected sink. For example in FIG. 1A, the path vector to sink F is 011, and the path vector to sink C is 00.

As shown in FIG. 1A, the sinks correspond to particular characters in a character set C, E, F, H, J and K. FIG. 1C shows an example of relating six of these characters C, E, F, H, J and K to eight bit byte codes having the *i* indices 0, 1, 2, 3, 4 and 5, respectively. By a similar tree and table, any character set may be made to correspond to any set of byte codes. It is well-known that a binary tree can be used to represent a minimal redundancy Huffman encoding of any character set, such as BCD, EBCDIC, USASCII and etc.

The invention utilizes a hardware or electronic representation of the binary tree in the form of a bit string T which is prior generated by a left list scan of all vertices in the binary tree. The bit string T is generated during the left list scan by inserting a 1 or 0 for each bit in the string according to whether the left list scan finds the corresponding vertex to be an inner vertex or a sink, respectively. The left list scan of the vertices in FIG. 1A encounters the vertices in the order A, B, C, D, E, F, G, H, I, J and K, respectively. FIG. 1B represents the generated bit string T in this example, in which it is seen that a 1 corresponds to each inner vertex and 0 corresponds to each sink in FIG. 1A. The vertex bits in the string T are sequenced in the order of their indices *j* which are shown in FIG. 1B as the set 0,1, . . . ,10. The general representation of string T indices is the set 0,1, . . . J.

Also in FIG. 1B, the sinks (i.e., the 0's) are identified by a sink number *i* in the set 0, 1, 2, 3, 4 and 5, respectively from left to right, and this number *i* is its sink index. The general representation of the *i* set is 0,1, . . . ,I. The relationship 2I=J holds for any binary tree.

FIG. 1C uses the *i* numbers as indices to the respective bytes shown in the table. Thus given a path vector, an *i* number can be obtained from the tree in FIG. 1A and used in the table in FIG. 1C to select the byte (character) represented by the path vector. The *i* number directly corresponds to the byte code in character sets with binary collated byte codes.

The need for translation from the *i* index to the character byte can be avoided when they are identical in the character set. This occurs when the byte coding of the characters in the given character set is the same as the *i* index for the characters when represented in their character collating sequence.

Once the *i* number is determined using a path vector, the process of finding the character in a table (if required) can easily be done by the prior art method of using the Translate (TR) instruction on an IBM S/360 Data Processing System to operate on a table as shown in FIG. 1D. In FIG. 1D, the *i* value is an index into the table at which the corresponding character byte is found, according to the relationship explained in regard to FIG. 1C.

The output of the embodiments herein represents the index *i* as the decoding for the inputted path vector, which might be received over a telephone line or by radio wave in the form shown in FIG. 1E. The Huffman variable length codes are self-defining as to their length. That is, the path vector decoding in the method of this invention automatically indicates the last bit in a path vector without the need for any length defining field with the characters.

The binary tree structure represented by bit string T is easily changed by using the left list scan of any binary tree structure. The binary tree structure can have different forms for the different character sets (i.e., BCD, EBCDIC, ASCII, etc.); but also the binary tree structure can have many different forms for the same character set, one use being to correlate the number of bits in the code for each character with the frequency of transmission of each character found in a data base, i.e., the number of transmitted bits is minimized by having the most frequently transmitted characters use the codes having the smallest number of bits.

The variable length character code is easily amenable to providing a parity bit (not shown) at the end of each variable length character, and odd parity would assure at least one level switching per character for selfclocking synchronization purposes and for error checking each received path vector. The use of parity bits for checking and synchronization is well-known in the art.

DECODING METHOD EMBODIMENT

The flow diagram in FIG. 2 illustrates the physical operations provided in an automatic device for each of the basic steps in the novel method of this invention. The method is entered once for each received variable length character signal in the Huffman code, which (as previously explained) is a variable length set of bits comprising a path vector in a binary tree representation of a particular character set. The flow diagram uses the received path vector bits to trace a path in the left list scan representation of the binary tree in the form of bit string T, as previously explained. The bit string T can be represented physically in any of a number of different forms in which its bits can be sequentially scanned from the beginning of the bit string, such as: (1) a closed loop shift register, (2) a set of binary latches, (3) a core memory, (4) a sequence of mechanical switches, (4) a monolithic storage device, and etc. There will be at least J number of bit positions in T, and each of the bit positions is initially preset to the 1 or 0 value required to represent the inner and sink vertices of the tree as previously explained in connection with FIGS. 1A and 1B.

Three counters are provided, which are: a skip counter C, a T bit sequence counter *j*, and a sink counter *i*. These counters may be hardware counters or they may be programmed counters. Counters *i* and *j* each are forward counters, i.e., an actuation causes one unit to be added to its content. Counter C is a forward and backward counter with two inputs, which respectively can provide a signal which adds or subtracts one unit to its content.

The method examines each path vector bit PVB in the path vector PV beginning with its most significant PVB and sequentially examining each next lesser significant PVB through its least significant PVB. The Huffman code representing the path vectors is self-defining in regard to the length of each path vector and therefore no additional bit positions are needed to define the length of the variable length character representations. Hence in a serial transmission, the first PVB of one path vector may immediately succeed the last PVB of the preceding path vector. Of course, the transmission medium may optionally provide one or more synchronization bauds intervening between the characters and/or a fixed number of parity bits appended to the end of each transmitted character.

The bit string T is scanned once per path vector PV, which scan starts at the first T bit at $j=0$ and ends at the bit in T determined by the current path vector, which can be at any value of *j* where $T[j]=0$, possibly including the Jth bit in T. In the method there is one sub-loop iteration for each bit in T being examined for the current PVB. Hence there can be up to J iterations in the method per PV. (The hardware decoding implementation provides a clock sub-cycle for each scanned bit in store T).

The method in FIG. 2 essentially traces a path in the tree represented by the bit string T with each current PV.

In order to understand how during a scan of store T the particular bits in store T are selected as representing the vertices in the path determined by the current PV, it is important to understand how intervening bits not representing path vertices for the current PV are skipped during the scan in store T. A principle used here is that in a regular binary tree, i.e., a binary tree whose inner vertices have outdegree 2, or in any subtree therein, the number of sinks is exactly one more than the number of its inner vertices. In the left list order representation of sinks and inner vertices by the bits in store T, all of the bits for any subtree are contiguous in store T.

Therefore any subtree in store T can be skipped while the bits in that subtree are being sequentially scanned by having a counter C add the number of 0 bits, (sinks) and subtract the number of 1 bits (inner vertices) until only one more 0 (sink) exists than the number of 1 bits (inner vertices).

But if the predecessor of each subtree being skipped is included in the inner vertex count (i.e., a 1 bit) by counter C, the inner vertex count becomes equal to the sink count when the entire subtree has been skipped. This is done in FIG. 2 in which skip counter C is initially set to 0 when entering a sequence of bits in store T representing any subtree to be skipped; C is incremented by 1 for each inner vertex (i.e., 1 bit), including the predecessor (i.e., an inner vertex) of the subtree, and C is decremented by 1 for each sink (i.e., a 0 bit). Then when counter C reaches zero, the subtree has been skipped; and the next bit in store T represents the bit for the right successor of the predecessor of the skipped subtree, which is a bit in the right path from the last bit representing a vertex in the path being traced. Hence whenever a right edge is being traced (i.e., for a PVB=1), the left subtree bits intervening in store T must be skipped to get the next T bit of the traced path.

The decoding method in FIG. 2 is entered upon the beginning of the reception of each path vector PV, whereupon counters C, $i$, and $j$ are all set to 0 by step 11 in FIG. 2. Then step 12 senses the next PVB, which is the first PVB, or the highest order PVB, in the current path vector on the first execution of step 12 after step 11. Next, step 13 tests whether the current PVB is a 0 or 1. If it is 0, the path being traced in the binary tree must take the left edge from the current inner vertex, but if the PVB is a 1, the right edge is taken from the current inner vertex.

If PVB is a 0, step 14 is entered which increments count $j$. The new value of $j$ is used to select the next sequential bit $T[j]$ in the bit string T, which is the bit representing the source of the left subtree of vertex $j-1$. Then step 15 tests the value of $T[j]$, and whenever it is 0 the process is ended, because a sink has been reached. The iterations continue through step 12 as long as step 13 finds a 0 PVB and step 15 finds $T[j]$ is 1, whereupon the process senses each next sequential PVB, and step 13 tests that PVB.

Whenever step 13 finds PVB has a 1 value, the right edge must be taken from the current vertex to define the required path, and the left subtree skipping loop is entered with step 16, which tests the current bit $T[j]$. If $T[j]$ is 1, step 17 is entered which increments count C, because $j$ is an inner vertex, and step 20 increments count $j$. The count C is then tested by step 21 which causes a loop back to step 16 if C is not 0.

However, if in step 16, bit $T[j]$ has a 0 value, step 18 is entered to decrement count C, because $j$ is a sink, and step 19 increments the sink count $i$. Then step 20 increments count $j$, and step 21 tests the current value of count C.

Whenever step 21 finds the value of count C is 0, then $j$ is the source of the right subtree of the predecessor of the skipped left subtree, and step 15 is entered to test the current $T[j]$, as has been previously described.

Whenever the EXIT from the method is taken at step 15, the current count $i$ corresponds to the character represented by the received path vector PV. The corresponding character is the value of $i$ for a dense character set having a binary collating sequence for its character values (such as either the EBCDIC or ASCII character set); but for character sets not having binary collation (such as the BCD character set), a translation table such as shown in FIG. 1C or 1D is required.

Decoding examples are provided in the following tables. Example 1 follows the method on a step by step basis in FIG. 2 for an input path vector of (1,0). Example 2 is a summarized representation in which each row represents a single iteration in the method in FIG. 2 for the same path vector (PV=1,0); one iteration occurs for each bit examined in T for each PVB. Reading each row left to right, one sees the successive values of each of the things listed at the top of each column. Example 3 is a summarized representation for PV=(1,1,1) which is the rightmost path in FIG. 1A.

EXAMPLE 1

(Step by step decode of PV=(1,0))

| AFTER STEP (S) | $i$ | $j$ | $c$ | PVB | $T_j$ |
|---|---|---|---|---|---|
| ENTER | | | | | |
| 11 | 0 | 0 | 0 | | |
| 12 & 13 | 0 | 0 | 0 | 1 | |
| 16 | 0 | 0 | 0 | | 1 |
| 17 | 0 | 0 | 1 | | |
| 20 | 0 | 1 | 1 | | |
| 21 & 16 | 0 | 1 | 1 | | 1 |
| 17 | 0 | 1 | 2 | | |
| 20 | 0 | 2 | 2 | | |
| 21 & 16 | 0 | 2 | 2 | | 0 |
| 18 | 0 | 2 | 1 | | |
| 19 | 1 | 2 | 1 | | |
| 20 | 1 | 3 | 1 | | |
| 21 & 16 | 1 | 3 | 1 | | 1 |
| 17 | 1 | 3 | 2 | | |
| 20 | 1 | 4 | 2 | | |
| 21 & 16 | 1 | 4 | 2 | | 0 |
| 18 | 1 | 4 | 1 | | |
| 19 | 2 | 4 | 1 | | |
| 20 | 2 | 5 | 1 | | |
| 21 & 16 | 2 | 5 | 1 | | 0 |
| 18 | 2 | 5 | 0 | | |
| 19 | 3 | 5 | 0 | | |
| 20 | 3 | 6 | 0 | | |
| 21 | 3 | 6 | 0 | | |
| 15 | 3 | 6 | 0 | | 1 |
| 12 & 13 | 3 | 6 | 0 | 0 | |
| 14 | 3 | 7 | 0 | | |
| 15 | 3 | 7 | 0 | | 0 |
| EXIT | | | | | |

Then from FIG. 1B, for $i=3$ the character is H.

EXAMPLE 2

(Iteration decode of PV=(1,0))

| | $j$ | PVB | T | C | $i$ |
|---|---|---|---|---|---|
| ENTER | 0 | 1 | 1 | 1 | 0 |
| | 1 | | 1 | 2 | 0 |
| | 2 | | 0 | 1 | 1 |
| | 3 | | 1 | 2 | 1 |
| | 4 | | 0 | 1 | 2 |
| | 5 | | 0 | 0 | 3 |
| | 6 | 0 | 1 | 0 | 3 |
| EXIT | 7 | | 0 | 0 | 3 |

Since $i=3$ at the exit of the method, the character is H in FIG. 1B.

EXAMPLE 3

(Iteration decode of PV=(1,1,1))

| | $j$ | PVB | T | C | $i$ | CHAR |
|---|---|---|---|---|---|---|
| ENTER | 0 | 1 | 1 | 1 | 0 | |
| | 1 | | 1 | 2 | 0 | |
| | 2 | | 0 | 1 | 1 | |
| | 3 | | 1 | 2 | 1 | |
| | 4 | | 0 | 1 | 2 | |
| | 5 | | 0 | 0 | 3 | |
| | 6 | 1 | 1 | 1 | 3 | |
| | 7 | | 0 | 0 | 4 | |
| | 8 | 1 | 1 | 1 | 4 | |
| | 9 | | 0 | 0 | 5 | |
| EXIT | 10 | | 0 | 0 | 5 | K |

At the EXIT of the method, $i=5$ signals that the character is K using the Table in FIG. 1B.

HARDWARE EMBODIMENT

Figure 3:
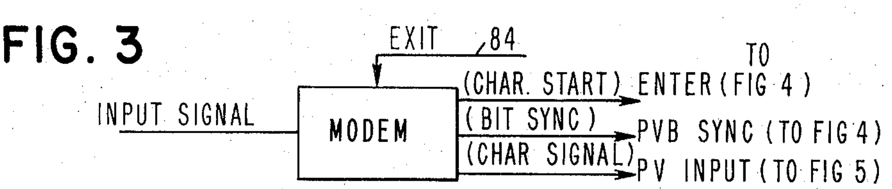
FIG. 3 illustrates a MODEM which decodes binary coded input signals for use in implementing the subject invention.
Figure 4:
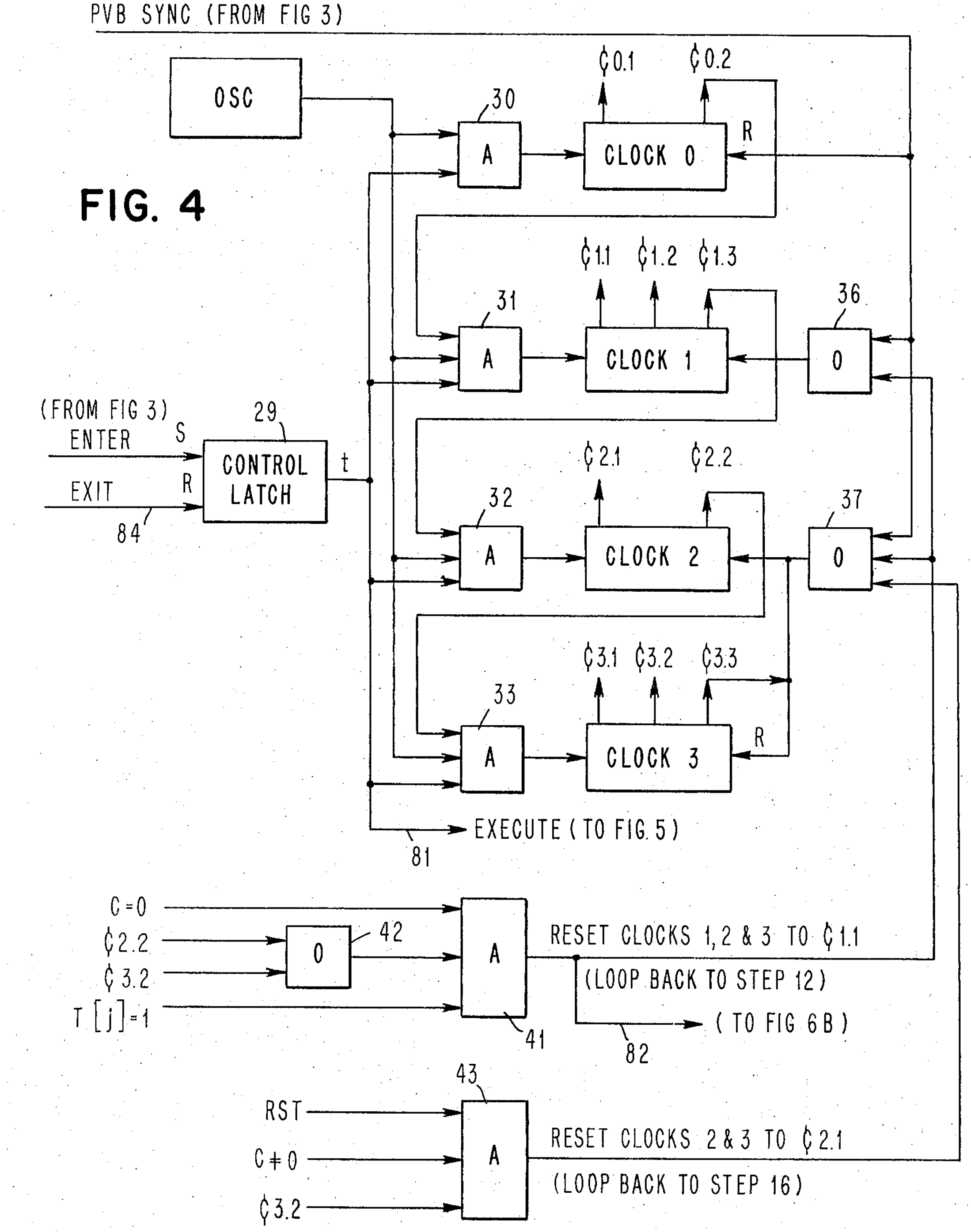
FIG. 4 shows a clocking hardware arrangement for generating the sequence of pulses required in the decoding circuitry shown in FIG. 5.
Figures 5, 5A:
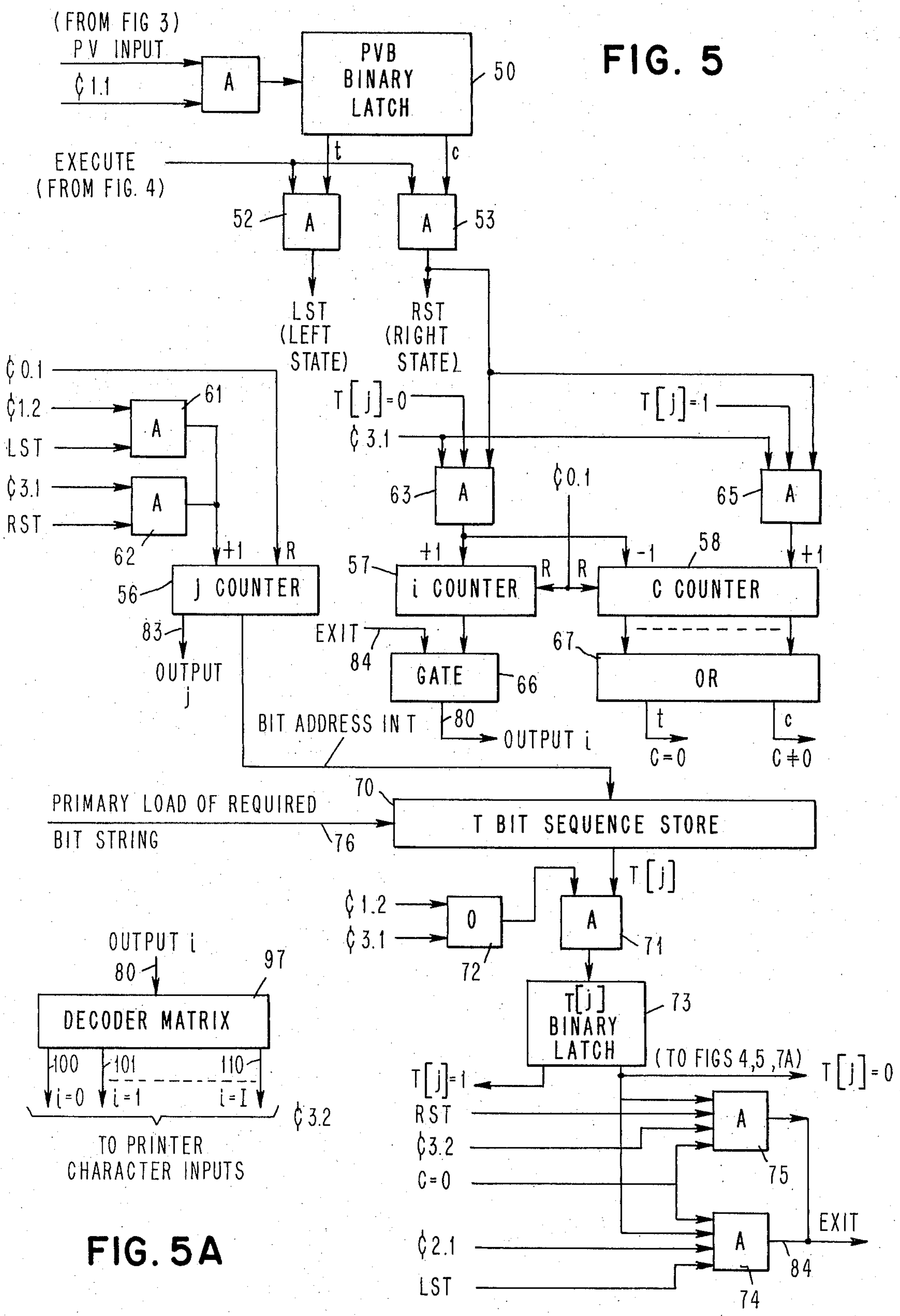
FIG. 5 illustrates a hardware embodiment for decoding received path vector encoded signals.
FIG. 5A shows hardware for flexibly decoding changeable path vector codes for a particular output character set.

The hardware embodiment receives signals from the data receiver shown in FIG. 3, generates detailed clocking signals with the circuits shown in FIG. 4 for actuating the path vector detecting circuits in FIG. 5 in accordance with the flow diagram in FIG. 2, and FIGS. 6A and 6B may receive the output of the circuit in FIG. 5 to generate electrical character signals.

A. Data Receiving Set

FIG. 3 illustrates a data receiving set (often called a MODEM) of the commercial type for receiving and amplifying an input signal, and for generating synchronization signals from the input, i.e., a CHARACTER START signal, a bit sync (synchronization) signal and a bilevel character signal such as shown by the wave forms in FIG. 1E. An EXIT input is also provided to the MODEM in FIG. 3, which is generated at the end of each received character by the detecting hardware shown in FIG. 5; hence it may be used by the MODEM for determining the end of each inputted character, and for generating the start of the next character, i.e., character start signal. The output lines from the MODEM are relabeled in accordance with the names which will be used for them in FIGS. 4 and 5.

B. Hardware Embodiment Clocking

The basic clock timing relationships for the hardware implementation are represented by the clock pulses shown in FIG. 2 as bracketed groupings of step(s) and identified by a ∅ symbol followed by two numbers with a decimal point between them. The left number (to the left of the decimal point) indicates the clock which generates the pulse, and the right number (to the right of the decimal point) indicates the sequence of pulses provided by a given clock. For example step 11 is executed during clock pulse ∅ 0.1, steps 12 and 13 during clock pulse ∅ 1.1, step 14 during ∅ 1.2, step 15 or 16 during ∅ 2.1, steps 17, 18 19 and 20 during ∅ 3.1 and step 21 or the EXIT during clock pulse ∅ 3.2.

FIG. 4 illustrates a clocking circuit arrangement which can provide the clock pulses to control hardware elements in FIG. 5 for executing the method in FIG. 2. A free-running oscillator OSC is provided which has a pulse rate that permits four interconnected clocks 0, 1, 2 and 3 to generate a set of 10 pulses (i.e., ∅ 0.1 to ∅ 3.3) during the period for examining one T bit in store 70. Since there are J number of T bits, the pulse rate for OSC must exceed J multiplied by the ten clock pulses, and multiplied by the transmission rate in bits/sec, i.e., 10J × transmission rate. For example, if T has 127 bits representing a character set of 64 characters, the pulse rate exceeds 1,270 pulses per input character bit (i.e., PVB). This presents no difficulty with the high speed logic circuits available having microsecond and nanosecond switching speeds.

In FIG. 4, a control latch 29 is provided which is set by the ENTER signal by each character start signal from the MODEM each time the method is entered for decoding a path vector. Latch 29 is reset when the execution of the method is completed (i.e., method EXIT) at the end of each input character, which is provided by the EXIT signal from FIG. 5 and which may be used to enable the start condition for the next inputted character. Thus the latch 29 output line, labeled EXECUTE, is activated throughout the decoding period of each PV.

In FIG. 4, the four integral clock circuits are illustrated as clock 0, clock 1, clock 2 and clock 3. Each clock circuit may be a conventional clock circuit which provides in sequence one output pulse at a time. Each of these clock circuits has a reset input R which, when actuated, sets the respective clock circuit to the beginning of its cycle, which enables its left most output pulse illustrated in FIG. 4. Each clock circuit is driven by pulses from an oscillator OSC permitted to pass through a respective AND gate 30, 31, 32 or 33. Each clock circuit sequences its output pulses in the direction from left to right in FIG. 4. Thus clock 0 receives oscillator pulses when control latch 29 is set; and after clock 0 is reset, pulse ∅ 0.1 is provided during the first oscillator pulse through AND gate 30. The next and each following oscillator pulses through AND 30 causes clock 0 to reach and stay at its next output ∅ 0.2, until its reset R input is again actuated (i.e., by the next PVB sync pulse). Then the ∅ 0.1 output pulse is again provided for a single oscillator pulse followed by the ∅ 0.2 output being provided during the next and following oscillator pulses until clock 0 is again reset.

AND circuit 31 for clock 1 is enabled to pass oscillator pulses by the activated levels of the ∅ 0.2 output from clock 0 and the $t$ output from latch 29. After its reset, clock 1 provides pulse ∅ 1.1 on the first oscillator pulse after the actuation of gate 31, followed by the ∅ 1.2 output pulse on the next oscillator pulse, which is followed by the ∅ 1.3 output on the next and all oscillator pulses thereafter received until clock 1 is reset, whereupon it repeats this procedure.

AND gate 32 enabled by the ∅ 1.3 output from clock 1 and by the set state of control latch 29 to thereby provide oscillator pulses to clock 2, which otherwise is identical to clock 0 in construction, and provides outputs ∅ 2.1 and ∅ 2.2 after reset with ∅ 2.2 remaining activated until the next reset.

Likewise AND gate 33 is enabled by output ∅ 2.2 from clock 2, and by the set state of latch 29 for providing oscillator pulses to clock 3, which is identical circuit-wise to clock 1, except that the last output ∅ 3.3 is connected to the reset input R of clock 3. This causes clock 3 to be reset at the end of each cycle which immediately begins its next cycle upon the next oscillator pulse after ∅ 3.3 so that clock 3 continuously recycles upon every three succeeding oscillator pulses as long as AND 33 is enabled.

The clock circuits in FIG. 4 are arranged to control the two backward branches provided in FIG. 2 for the two subloops, i.e., one reentering step 12 from step 15, and the other entering step 16 from step 21. It is seen in FIG. 2 that entering step 12 requires going back to clock output ∅ 1.1 to begin the clock recycling from it. This is done by an output from an AND gate 41 in FIG. 4 which resets only clocks 1, 2 and 3 by providing its output through OR circuits 36 and 37 to their reset inputs R. (Note that the output from AND 41 is not applied to the reset input of clock 0, and hence it is not then reset and thereby retains its output of ∅ 0.2 which continues to enable AND 31. Thus after the reset from AND 41, the clock begins its pulse sequence with ∅ 1.1 upon the next oscillator pulse passing through AND 31.)

The other loop condition is obtained by an output of an AND circuit 43, which resets only clocks 2 and 3 to begin the clock pulse sequence at ∅ 2.1 upon the occurrence of the next oscillator pulse. This is done by applying the output of AND 43 only to OR circuit 37 which actuates the reset input R of clocks 2 and 3 only. (Note that clock 1 is not reset and maintains its output ∅ 1.3 for enabling AND 32 so that clock 2 output ∅ 2.1 occurs next after resetting clocks 2 and 3).

The inputs to gates 41 and 43 are labeled in FIG. 4 to represent both the names of electrical signals generated in FIG. 5 and the method conditions required in FIG. 2. That is, the input conditions for AND gates 41 and 43 can be seen directly from flow diagrams in FIG. 2. Thus it is apparent that gate 41 is actuated for the conditions at step 15 whether it is entered from step 14 or step 21. In either case the T[*j*] bit must have a 1 setting, counter C must be set to 0, and these conditions must occur at either clock ¢2.1 or ¢3.2.

The input conditions for AND gate 43 are also apparent in FIG. 2 since the branch back from step 21 to step 16 only occurs when the right path has been taken (i.e., RST signal indicates this), counter C has a non-zero content, and the clock is at ¢3.2.

C. Hardware Logic Circuits

FIG. 5 illustrates the hardware logic which uses the clock output to decode the input character signals (i.e., path vectors), Thus a PVB binary latch 50 is set to the current PVB input signal level, and it provides two complimentary outputs which may be identified as the true (*t*) and complement (*c*). Thus the input to latch 50 is provided from an AND circuit 51 which receives this PVB input from the MODEM in FIG. 3 and clock ¢1.1. Thus the *t* and *c* outputs of latch 50 are oppositely actuated to the high and low voltage levels according to whether the PVB input level is 1 or 0, i.e., up or down. One of AND gates 52 or 53 is actuated by the *t* or *c* signal when they are conditioned by the EXECUTE output line from control latch 29. Thus one of AND gates 52 or 53 provides an output until the EXIT from the method is reached which deactivates the EXECUTE line. A LST (left state) signal is provided from gate 52 when it is enabled by the *t* line, or a RST (right state) signal is provided from gate 53 when it is enabled by the *c* line.

Three electronic counters 56, 57 and 58 are provided to generate count *j*, count *i* and count C, respectively. Each of these counters is reset at clock ¢0.1.

Counter *j* is incremented by the output of either gate 61 being activated by the LST signal and ¢1.1 (i.e., step 14), or by gate 62 being activated by the RST signal and ¢3.1 (i.e., step 20).

Counter 57 is incremented by gate 63 at clock ¢3.1, the RST signal, and a signal T[*j*]=0 provided from binary latch 73 (i.e., step 19).

Counter 58 is decremented by the same signal from gate 63 (i.e., step 18). Also counter C is incremented by a signal from a gate 65 when actuated by the opposite output T[*j*]=1 from latch 73 and the RST signal from gate 53 at clock ¢3.1 (i.e., step 17).

An OR circuit 67 receives outputs from all of the stages in counter C to detect if they are all 0 and then to activate its *t* line with an output signal C=0; or if any counter stage is not 0, to activate its *c* line to the complementary output signal C ≠ 0 (i.e., step 21).

Gate 66 passes the *i* count output from circuit 57 when it is activated by the EXIT line from either an AND circuit 74 or 75 which signal the completion of decoding for each received character.

A T bit sequence store 70 has stored within it a bit string representing a left list scan of a binary tree, as previously explained herein in the section entitled "Binary Tree Decoding Relationships." Store 70 is loaded before any PVB input is provided to the circuit in FIG. 5. The preliminary loading operation may be done manually by setting manual switches which may comprise each bit position in store 70 (i.e., one manual switch per bit). The manual switch store should be a most satisfactory way of operation for circumstances where the character set attributes being used are not changed very often. (By analogy, commonly used telegraph equipment hardly ever changes the character set attributes being used). Alternatively, store 70 may be any of the electronically loadable stores such as a register, a shift register, a core memory, monolithic circuits, etc., of which many types are well-known in the art and in commercial use. The electronically loadable store is preferred when the character set attributes are changed frequently, and the bit string is loaded into store 70 via input lead 76.

The T bit sequence store 70 is addressed by the output of counter 56 which selects a particular bit stored therein at index *j*. The selected bit value T[*j*] is provided to an AND gate 71 which is actuated by the output of an OR circuit 72 at either clock ¢1.2 or ¢3.1 to set a T[*j*] binary latch 73 to a state which directly corresponds to the value of the bit then addressed in store 70 by counter 56. Thus AND gate 71 is being activated at the same time (¢1.2 or ¢3.1) that index *j* (counter 56) and bit T[*j*] (store 70) are being activated. Consequently the state of latch 73 will settle down to a correct state by the end of the respective clock pulse, which is satisfactory since the output of latch 73 is not used until the next clock period, ¢2.1 or ¢ 3.2, respectively.

The complementary outputs *t* and *c* from latch 73 are lines identified as T[*j*]=1 and T[*j*]=0. The T[*j*]=0 output and the C=0 signal from OR circuit 67 are provided to both AND gates 74 and 75 as prerequisites for detecting the EXIT condition upon completion of detecting a character. Gate 74 further receives the LST signal and clock ¢ 2.1 to generate an EXIT signal (i.e., step 15 entered from step 14). Gate 75 additionally receives signal RST and clock ¢3.2 to generate an EXIT signal (i.e., step 15 reached from step 21).

OUTPUT CONTROL HARDWARE

A primary advantage in the use of the subject invention over prior terminal decoding systems is in the flexibility and ease with which the decoding tree representation in the store T may be changed to correspond to a change in the transmitted codes so that the decoding may be correspondingly changed. For example, the codes may be changed to reflect a different relationship between the variable length codes and the characters in an output character set which is printed. These code changes may be done in order to improve the efficiency in the transmission process such as by minimizing the number of transmitted bits in the well known technique of requiring the most frequently transmitted characters to have the minimum number of bits in their codes and, conversely, to have the least frequently used characters have the largest number of bits in their codes. Such frequency relationships may be made to depend upon the particular data base being transmitted, since a particular character (for example, "*s*") may be transmitted very frequently in one data base, but may be transmitted infrequently in another data base.

Figure 7:
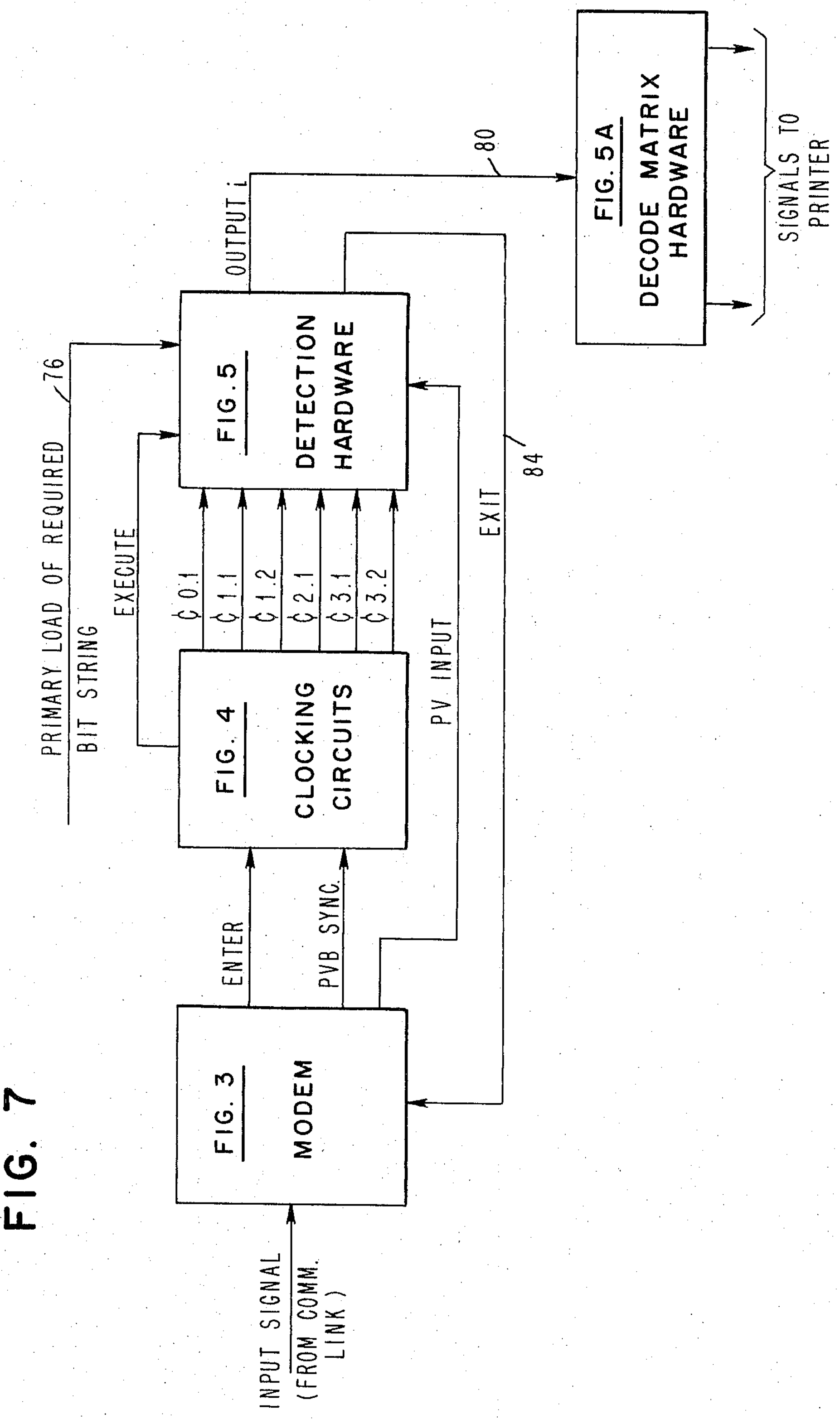

Furthermore a fixed transmitted character coding may be made to correspond to different character sets being printed out. For example, this is commonly found with the IBM selectric typewriter with an IBM 2741 terminal when the typing balls are changed for the different character sets, even though the transmitted byte codes to the terminal may not be changed. The embodiments shown in FIGS. 6A, B, C, and 7A and B illustrate different types of hardware output decoding. In FIGS. 6A, B and C, a particular binary tree network decoding is illustrated. But in FIG. 7A and B, a flexible decoding relationship is illustrated where different variable length codes respectively representable by a binary tree can be decoded into the same positional output $i$=0 through $i$=I.

A. Variable Sink Controlled Output

FIG. 5A illustrates a preferred circuit arrangement which can decode any form of binary tree in store T, having its sinks in any bit positions $j$. This permits different binary trees to be loaded into store T and used without any hardware change to the system except for a resetting of the bit position in store T. That is, a different binary tree will have its sinks located at different $j$ indices in store T, as determined by a left list scan of the respective binary tree.

In FIG. 5A, the output $i$ signal from counter 57 in FIG. 5 provides a coded sink output signal when the final sink bit position is sensed for a path vector during a scan of store T. A decode matrix 97 receives and decodes the output $i$ signal on a respective one of its output lines 100 – 110, which can provide respective character inputs to a printer for actuating its respective character printing operations. Circuit 97 may be conventional in design and has I+1 number of output lines. Only one of decoded output lines 100 – 110 which is energized by matrix 97 to provide the character output signal to the printer to represent the current path vector. Hence the selected output line corresponds to the sink index for the last selected sink bit in the bit sequence store T in FIG. 5 as a result of a path vector decode.

The circuit arrangement in FIGS. 4, 5 and 5A with a store T having J+1 bit positions will accommodate binary trees having up to J+1 number of vertices, including up to J/2 number of sinks, and printer devices having up to J/2 characters in their character set.

Thus whenever a binary tree's left list scan is inputted into store T, the indices for the sinks in store T are dynamically selected by matrix circuit 97 in FIG. 5A using any electronic version of the matrix circuit which is well-known in the art.

B. Inner Vertex Controlled Output

It was previously explained in connection with FIG. 5 how the $j$ count existing at the EXIT from the method can be used to obtain the required character which was transmitted as a PV. FIG. 6A and FIG. 6B illustrate circuits for performing the same type of character selection operations. FIG. 6A comprises a tree identical in configuration with that shown in FIG. 1A. FIG. 6A additionally includes a single throw double pole switch in each node. Each switch is positioned at a normal bias, which is at its left contact. The position of the switch is actuatable by a signal to its relay coil. The signals to the relay coils are provided by the outputs in FIG. 6B having the same label A, B, D, G or I. Whenever any switch in FIG. 6A is set by a signal from the circuit in FIG. 6B, the switch setting is maintained thereafter until the switch is set by a next signal.

Upon the completion of the switch settings for any given character, an electrical circuit is completed from an electrical input source (+D.C.) provided to the switch in the source node A to one of the sink nodes C, E, F, H, J or K. This circuit can be used to drive an electric printer, or teletypewriter, correspondingly by connecting its sink nodes as inputs to the printer device.

In FIG. 6B, a gate 91 receives output $j$ provided from counter 56 in FIG. 5, selects the particular outputs $j$ (except for $j$=0) which represent the inner vertices (except vertex A) determined by each path vector, and passes each selected output $j$ to a decode circuit 92. The source vertex A is a special case which is always selected; it is decoded by AND 85 which receives the PVB input and ¢0.1 which is only provided when $j$=0. Hence the A signal from AND 85 only is activated at ¢0.1 if the PVB input is then at the 1 level which activates the coil for switch A in FIG. 6A to move it to the right. If the PVB is 0 level, the switch A remains in its left position because the coil is not energized. Gate 91 makes the selection of non-zero $j$ counts by detecting the $j$ count existing when step 15 loops back to step 12 in FIG. 2, which is signalled by activation of line 82 from AND 41 in FIG. 4 during ¢2.1. And line 82 is only activated for inner vertices, since gate 41 is conditioned by the T[$j$]=1 line.

The non-zero selected $j$ count signals are received by a decode circuit 92 which decodes the selected $j$ count in accordance with the table in FIG. 6C to activate the corresponding signal of B, D, G or I. Circuit 92 is a decoding matrix of well-known form which actuates one of its four output gates 86 – 89 to represent a selected inner vertex B . . . I determined by the selected $j$ count. AND gates 86, 87, 88 and 89 are all enabled by the PVB input. Accordingly the selected gate 86 – 89 has its output signal energized only if the current PVB signal has a 1 level to then energize its connected coil in FIG. 6A. Accordingly the corresponding switch in FIG. 6A remains in its left biased position if the current PVB input signal has a 0 level.

It should now be apparent to those skilled in the art how the invention can be used to decode path vectors and select corresponding output characters in any of a large number of ways whether by hardware or computer programming, since the flow diagram in FIG. 2 can be coded in any programming language for implementation on any general purpose computer system, such as an IBM S/360.

Since the invention has been particularly shown and described with reference to preferred embodiments thereof, it will be understood by those skilled in the art that the foregoing and other changes in form and details may be made therein without departing from the spirit and scope of the invention.

What is claimed is:

1. Means for decoding self-defining coded signals received from a transmission device, said signals being coded according to path vectors in a binary tree which represents a character set used for data being transmitted, comprising a bit sequence store having bit positions initially set to 0 and 1 electronically detectible states in accordance with a left list scan of vertices in said binary tree, each bit position setting a zero or one representing the sink or inner state respectively of each vertex encountered in said left list scan, and means for scanning said bit sequence store from a bit position that begins said left list scan to detect a bit position with a sink state determined by inputted path vector coded signals, means for counting the bit positions in said bit sequence store having sink states from the beginning of each scan to generate a sink index count, and outputting the sink index count upon the detection of said bit position by said scanning means as the detected output of said path vector coded signals, whereby said codes are easily changeable by changing the binary tree left list scan settings in said bit sequence store.

2. Means as defined in claim 1 comprising matrix means for decoding the detected output provided by said outputing means into a signal on a unique output line, whereby said output line can be an input for driving an electrical printer.

* * * * *